(12) United States Patent
Ou et al.

(10) Patent No.: US 8,739,088 B1
(45) Date of Patent: May 27, 2014

(54) USING CONSTRAINTS WTIHIN A HIGH-LEVEL MODELING SYSTEM FOR CIRCUIT DESIGN

(75) Inventors: Jingzhao Ou, San Jose, CA (US); Chi Bun Chan, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 410 days.

(21) Appl. No.: 12/581,104

(22) Filed: Oct. 16, 2009

(51) Int. Cl.
   *G06F 17/50* (2006.01)

(52) U.S. Cl.
   USPC .......................................... 716/106

(58) Field of Classification Search
   USPC ................... 716/102, 104, 106, 108
   See application file for complete search history.

(56) References Cited

U.S. PATENT DOCUMENTS

| | | | | |
|---|---|---|---|---|
| 6,058,492 | A * | 5/2000 | Sample et al. | 714/33 |
| 6,230,307 | B1 * | 5/2001 | Davis et al. | 716/116 |
| 6,907,584 | B1 * | 6/2005 | Milne et al. | 716/102 |
| 7,110,935 | B1 | 9/2006 | Hwang et al. | |
| 7,143,369 | B1 * | 11/2006 | Milne | 716/102 |
| 7,340,719 | B1 * | 3/2008 | Bakerman et al. | 717/106 |
| 2002/0138812 | A1 * | 9/2002 | Johannsen | 716/5 |
| 2002/0166103 | A1 * | 11/2002 | Rittman et al. | 716/11 |
| 2005/0193359 | A1 * | 9/2005 | Gupta et al. | 716/18 |
| 2006/0190905 | A1 * | 8/2006 | Martin et al. | 716/18 |
| 2006/0282800 | A1 * | 12/2006 | Varadarajan | 716/2 |
| 2007/0083831 | A1 * | 4/2007 | Hamilton et al. | 716/1 |
| 2007/0174795 | A1 * | 7/2007 | Lavagno et al. | 716/3 |
| 2007/0271545 | A1 * | 11/2007 | Eng | 716/18 |
| 2008/0172639 | A1 * | 7/2008 | Keysar et al. | 716/5 |
| 2009/0007050 | A1 * | 1/2009 | Martin et al. | 716/16 |
| 2009/0031278 | A1 * | 1/2009 | McElvain et al. | 716/18 |
| 2009/0144675 | A1 * | 6/2009 | Haufe et al. | 716/4 |
| 2009/0235220 | A1 * | 9/2009 | Aoyama | 716/10 |
| 2010/0318946 | A1 * | 12/2010 | Hamilton et al. | 716/104 |

OTHER PUBLICATIONS

Xilinx, Inc., "System Generator for DSP, Getting Started Guide", Rel. 10.1, Mar. 2008, 93 pages, Xilinx, Inc., 2100 Logic Drive, San Jose, California.

* cited by examiner

*Primary Examiner* — Vuthe Siek
*Assistant Examiner* — Aric Lin
(74) *Attorney, Agent, or Firm* — Kevin T. Cuenot

(57) ABSTRACT

A computer implemented method for designing a circuit includes associating a high level design constraint with a first high level circuit component of a high level circuit design within a high level modeling system and translating the high level circuit design into a low level circuit design comprising at least one low level circuit component derived from the first high level circuit component. The method also includes automatically generating at least one low level design constraint from the high level design constraint for at least one low level circuit component and storing each low level design constraint in association with the low level circuit design.

18 Claims, 5 Drawing Sheets

905 { mix_stuffs = find_system(subsystem_path, 'Name', "Critical_Stuffs");
910 { xlAddConstraint(mix_stuffs, 'MAXDELAY', 2);

FIG. 9

```
% obtain the handle of 'd' port
handleDPort = getPortHandle(gcbh, 'd');

% obtain the handle of 'q' port
handleQPort = getPortHandle(gcbh, 'q');

% find the block that connect to port 'd'
d_block = get_connect_blocks(gcbh, 'd');

if get_clock_domain(d_block) ~= get_clock_domain(gcbh)
        addConstraint(handleDPort, 'TIG');
end % find the blocks that connect to port 'q'
q_blocks = get_connect_blocks(gcbh, 'q');

if get_clock_domain(q_blocks) ~= get_clock_domain(gcbh)
        addConstraint(handleQPort, 'TIG');
end
```

USING CONSTRAINTS WITHIN A HIGH-LEVEL MODELING SYSTEM FOR CIRCUIT DESIGN

RESERVATION OF RIGHTS IN COPYRIGHTED MATERIAL

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

One or more embodiments disclosed within this specification relate to integrated circuit devices (ICs). More particularly, one or more embodiments relate to specifying constraints for a high level circuit design, specified through a high level modeling system, to be implemented within an IC.

BACKGROUND

A high level modeling system (HLMS) is a computer-based circuit design tool that allows a user to create a circuit design at a high level of abstraction. An HLMS provides a graphic design environment within which the user creates circuit designs using a "drag-and-drop" design paradigm. The user can drag graphic blocks into the design environment. Each graphic block represents a particular circuit function. For example, a graphic block can represent a function such as multiplexing, addition, multiplication, filtering, or the like. Within the design environment, the user also can specify connectivity and signal flows within the circuit design and among the blocks by drawing lines representing signals that interconnect the various blocks within the design environment of the HLMS.

Because the circuit design is specified at a high level of abstraction, significant processing is required in order to express the HLMS circuit design as a low level circuit design, e.g., using a hardware description language such as VHDL or Verilog or in the form of a netlist. Examples of some of the process steps can include flattening the hierarchically ordered HLMS circuit design, scrubbing names of particular blocks and signals, etc. The HLMS performs these processing steps to avoid conflicts between names and to avoid other syntactic issues when the HLMS circuit design, which is typically a subsystem of a larger system design, is joined with other subsystems of the larger system design. This processing, however, makes it difficult for a user to identify the low level circuit components generated, or derived from, the blocks, signals, and ports of the HLMS circuit design.

Presently, users have a limited ability to specify constraints within an HLMS circuit design. Typically, constraints may only be applied to the boundary of the HLMS circuit design, but not to internal nodes of the HLMS circuit design. This means that the user must manually apply low level design constraints to the low level circuit design generated from the HLMS circuit design. Unfortunately, the processing that generates the low level circuit design, as noted, makes it difficult for a user to identify the correct low level circuit components to which constraints are to apply.

SUMMARY

One or more embodiments disclosed within this specification relate to integrated circuit devices (ICs) and, more particularly, to specifying constraints for a high level circuit design to be implemented within an IC. One embodiment of the present invention includes a computer implemented method for designing a circuit, where the method includes associating a high level design constraint with a first high level circuit component of a high level circuit design, and translating the high level circuit design into a low level circuit design comprising at least one low level circuit component derived from the first high level circuit component. The method also includes automatically generating a least one low level design constraint from the high level design constraint for the at least one low level circuit component, and storing each low level design constraint in association with the low level circuit design.

Another embodiment of the present invention includes a computer implemented method for designing a circuit, where the method includes associating design constraint program code with a first high level circuit component of a high level circuit design within a high level modeling system, where the design constraint program code specifies at least one high level design constraint and at least one criterion for applying the high level design constraint. Responsive to executing the design constraint program code within the high level modeling system, a determination can be made as to whether the at least one criterion is met. In response, the high level design constraint can be applied to at least one selected high level circuit component of the high level circuit design specified by the design constraint program code according to whether the at least one criterion is met. The method can include storing the high level circuit design comprising the high level design constraint.

Another embodiment of the present invention can include a device. The device can include a data storage medium usable by a system, wherein the data storage medium stores program code that, when executed by the system, causes the system to execute operations. The operations can include associating a high level design constraint with a first high level circuit component of a high level circuit design and translating the high level circuit design into a low level circuit design comprising at least one low level circuit component derived from the first high level circuit component. The operations can include automatically generating a least one low level design constraint from the high level design constraint for the at least one low level circuit component and storing each low level design constraint in association with the low level circuit design.

BRIEF DESCRIPTION OF THE DRAWINGS

FIG. 9 is a ninth block diagram illustrating programmability of high level design constraints in accordance with another embodiment of the present invention.

FIG. 10 is a tenth block diagram illustrating programmability of high level design constraints in accordance with another embodiment of the present invention.

DETAILED DESCRIPTION OF THE DRAWINGS

While the specification concludes with claims defining features of the embodiments of the invention that are regarded as novel, it is believed that the embodiments described will be better understood from a consideration of the description in conjunction with the drawings. As required, detailed embodiments of the present invention are disclosed herein; however, it is to be understood that the embodiments are merely exemplary of the inventive arrangements, which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the embodiments of the invention.

One or more embodiments disclosed within this specification relate to an integrated circuit device (IC) and, more particularly, to specifying constraints for a circuit design to be implemented within an IC using a high level modeling system (HLMS). In accordance with the inventive arrangements disclosed herein, one or more constraints can be associated with various high level circuit components of a circuit design specified within an HLMS, referred to herein as an "HLMS circuit design." When the HLMS circuit design is translated into a low level circuit design such as a circuit design specified using a hardware description language (HDL) or in the form of a netlist, the high level design constraints specified within the HLMS can be applied to the relevant low level circuit components derived from the high level circuit components of the HLMS circuit design.

In accordance with another aspect of the embodiments disclosed within this specification, intelligence and reusability can be incorporated into high level circuit components. More particularly, program code that is executable within the HLMS can be associated with one more high level circuit components of the HLMS circuit design. The program code can specify conditions under which the program code is to be executed and further perform analysis upon the HLMS circuit design when executed. The analysis performed by the program code can be used to selectively apply high level design constraints, in an intelligent and dynamic manner, without the user having to explicitly indicate each high level circuit component to which the high level design constraint is to be applied.

Figure 1:
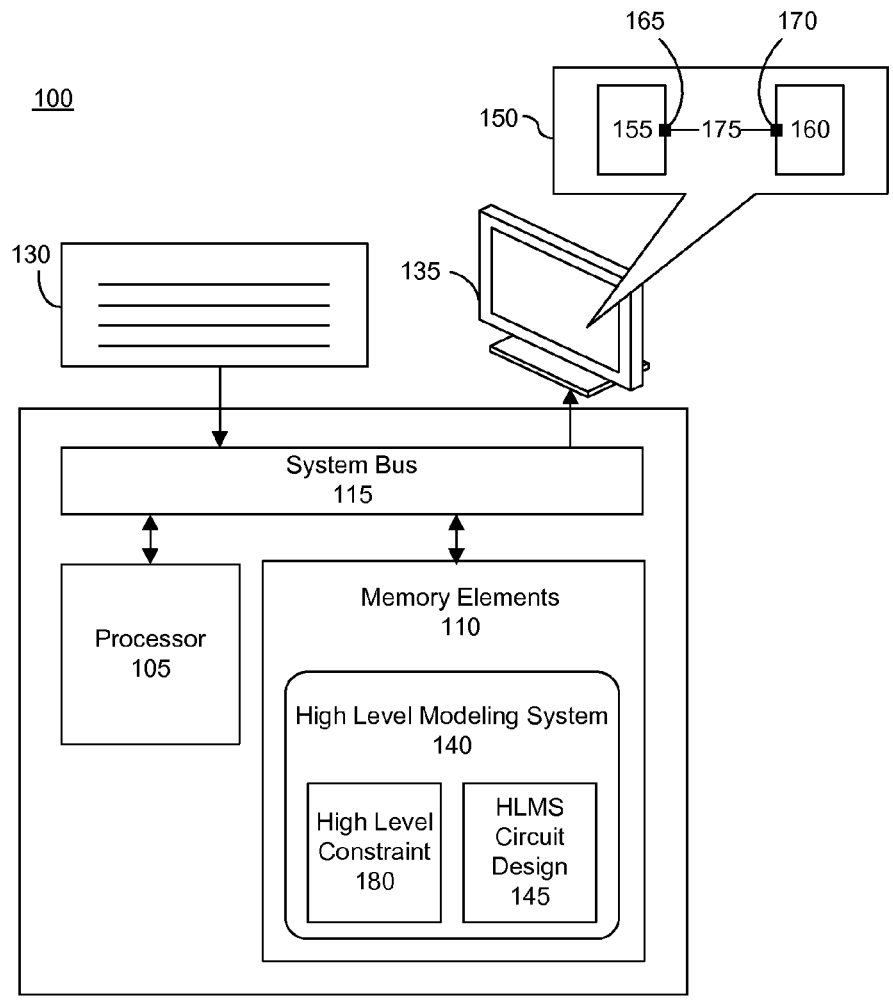
FIG. 1 is a first block diagram illustrating a system for designing a circuit in accordance with one embodiment of the present invention.

FIG. 1 is a first block diagram illustrating a system 100 for designing a circuit in accordance with one embodiment of the present invention. In one aspect, system 100 can generate one or more circuit designs for instantiation within, or implementation as, an IC. The circuit designs that are generated can be instantiated within an IC, whether the IC is a programmable IC or not.

A programmable IC is a well-known type of IC that can be programmed to perform specified logic functions. Examples of programmable ICs can include, but are not limited to, field programmable gate arrays (FPGAs), complex programmable logic devices (CPLDs), and mask programmable devices. The phrase "programmable IC" refers to the ICs noted herein and ICs that are only partially programmable. For example, another type of programmable IC includes a combination of hard-coded transistor logic and a programmable switch fabric that programmably interconnects the hard-coded transistor logic.

System 100 can include at least one processor 105 coupled to memory elements 110 through a system bus 115. As such, system 100 can store program code within memory elements 110. Processor 105 can execute the program code accessed from memory elements 110 via system bus 115. In one aspect, for example, system 100 can be implemented as a computer that is suitable for storing and/or executing program code. It should be appreciated, however, that system 100 can be implemented in the form of any system comprising a processor and memory that is capable of performing the functions described within this specification.

Memory elements 110 can include one or more physical memory devices such as, for example, local memory and one or more bulk storage devices (not shown). Local memory refers to random access memory or other non-persistent memory device(s) generally used during actual execution of the program code. The bulk storage device can be implemented as a hard drive or other persistent data storage device. System 100 also can include one or more cache memories (not shown) that provide temporary storage of at least some program code in order to reduce the number of times program code must be retrieved from the bulk storage device during execution.

Input/output (I/O) devices such as a keyboard 130, a display 135, and a pointing device (not shown) optionally can be coupled to system 100. The I/O devices can be coupled to system 100 either directly or through intervening I/O controllers. Network adapters also can be coupled to system 100 to enable system 100 to become coupled to other systems, computer systems, remote printers, and/or remote storage devices through intervening private or public networks. Modems, cable modems, and Ethernet cards are examples of different types of network adapters that can be used with system 100.

As pictured in FIG. 1, memory elements 110 can store an HLMS 140. HLMS 140, being implemented in the form of program code, can be executed by system 100. HLMS 140 allows a user, e.g., a circuit designer, to associate one more constraints with various high level circuit components of a circuit design being developed within the design environment provided by HLMS 140 as executed within system 100. One example of an HLMS is System Generator for Digital Signal Processing™, also known as "SysGen" available from Xilinx, Inc., of San Jose, Calif. SysGen is a high-performance, computer-based design tool that executes as part of Simulink®, available from The MathWorks, Inc., of Natick, Mass., to provide a high-level, graphical modeling environment. Simulink runs in Matlab®, also available from The MathWorks, Inc., of Natick, Massachusetts, and is an interactive tool for modeling, simulating, and analyzing dynamical systems.

HLMS 140 can provide a graphic design environment within which the user can create a circuit design using a "drag-and-drop" design paradigm. It should be appreciated that while HLMS 140 provides such a graphic design environment, command line functionality also is, or can be, provided for developing an HLMS circuit design such as HLMS circuit design 145 stored within memory elements 110. Regarding the graphic design environment, box 150 illustrates a view presented on display 135. The view includes at least a portion of HLMS circuit design 145 being developed within the design environment of HLMS 140 (hereafter both HLMS 140 and system 100 are collectively referred to as "the system" or "system 100").

Box 150 includes two blocks 155 and 160. Each of blocks 155 and 160 represents a particular circuit function. In the example illustrated in FIG. 1, each of blocks 155 and 160 includes a port. Block 155 includes port 165. Block 160 includes port 170. A "port," as used herein, refers to an interface, or a programmatic representation thereof, comprising at least one signal, which can be represented as a signal line within system 100, through which a block representing a circuit communicates with at least one other block. Within this specification, the term "signal" can represent one or more signals, e.g., the conveyance of a single bit through a single wire or the conveyance of multiple parallel bits through multiple parallel wires, unless otherwise indicated. Further, each signal can represent bi-directional communication between two, or more, HLMS components connected by the signal line.

Blocks 155 and 160 are coupled together by a signal line 175. As shown, signal line 175 couples to ports 165 and 170. Within this specification, the phrase "HLMS component" is intended to refer to any one of the set of objects that can be used within the HLMS design environment to specify and/or create HLMS circuit design 145. For example, an HLMS component can refer to the class of objects comprising a block, a signal line, or a port.

In one embodiment, a high level design constraint 180 can be assigned, or associated with, an HLMS component. As such, high level design constraint 180 can be stored within memory elements 110 in association with HLMS circuit design 145 and further in association with one or more HLMS components of HLMS circuit design 145. For purposes of illustration, consider the case where high level design constraint 180 is a timing constraint for the signal path between blocks 155 and 160. In that case, high level design constraint 180 can be assigned to block 155. A similar, or same, result can be achieved by assigning high level design constraint 180 to block 160, port 165, port 170, and/or signal line 175, as will be described herein in further detail.

Within HLMS circuit design 145, it should be appreciated that the various HLMS components, e.g., blocks 155 and 160, ports 165 and 170, and HLMS signal line 175, each can represent a plurality of low level circuit components as represented using HDL or within a netlist. For example, if signal line 175 represents a 16 bit bus, signal line 175 can be translated into 16 low level circuit components such as 16 wire type HDL components or 16 wire elements within a netlist. When translating HLMS circuit design 145 into a low level circuit design, the low level circuit components derived from each respective HLMS component can be identified. This facilitates application of a low level design constraint derived from high level design constraint 180 to the relevant low level circuit components.

Thus, one or more embodiments described within this specification allow a user to associate particular HLMS components, including those HLMS components that are equivalent to or represent internal nodes of HLMS circuit design 145, with high level design constraints. An "internal node" of an HLMS circuit design can refer to any signal line, port, or other connection that is not a top level port used to access the subsystem from another subsystem, e.g., from another circuit external to the particular subsystem being designed within system 100. For example, an internal node of HLMS circuit design 145 can be any node other than a top level port of HLMS circuit design 145. The high level design constraints are translated into low level design constraints and applied to the appropriate low level circuit components. By comparison, within a conventional HLMS, design constraints are only assignable to the top level port(s) of the HLMS circuit design, e.g., the subsystem, being developed within the HLMS. Such is the case since the top level port names are left unchanged when translated into a low level circuit design in order to couple the low level circuit design generated from the HLMS circuit design to one or more other low level circuit designs (of a larger system) that share the same top level port names.

Figure 2:
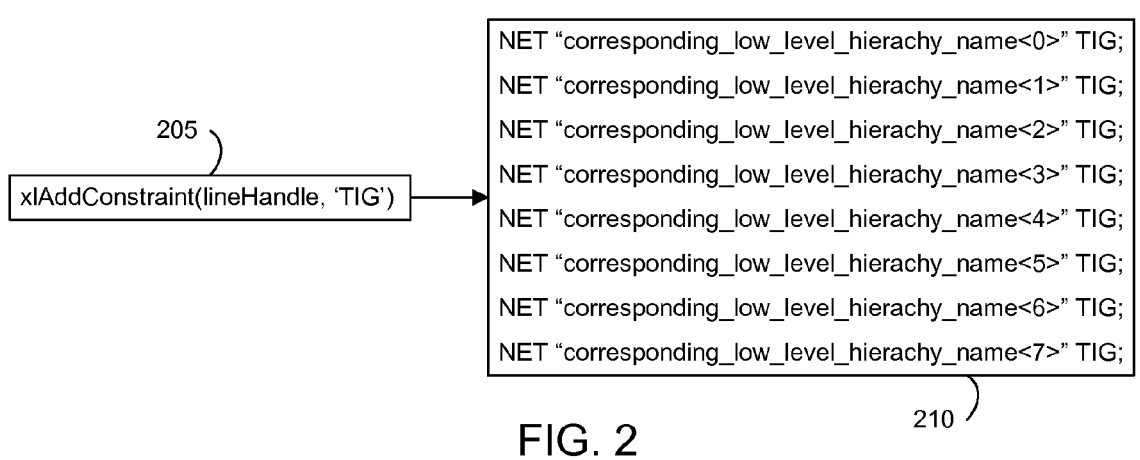
FIG. 2 is a second block diagram illustrating the translation of a high level design constraint to low level design constraints in accordance with another embodiment of the present invention.

FIG. 2 is a second block diagram illustrating the translation of a high level design constraint to low level design constraints in accordance with another embodiment of the present invention. More particularly, FIG. 2 illustrates the translation of a high level design constraint assigned to a signal line type of HLMS component to corresponding low level design constraints as performed by the system illustrated with reference to FIG. 1. In the example presented in FIG. 2, the high level design constraint is a "TIG" constraint. A "TIG" constraint refers to a type of timing constraint called a "timing ignore" constraint. A high level TIG design constraint can be associated with one or more high level circuit components to indicate that timing is to be ignored. A high level TIG design constraint can be assigned to one or more high level components that cross clock domains, for example. For instance, consider the case where a first block is located within a first clock domain and a second block is located in a second and different clock domain. In that case, the circuit designer can associate the signal line that couples the first block with the second block with a high level TIG design constraint.

In one embodiment, a user can specify an instruction that causes the system to assign a high level design constraint to a high level circuit component through the graphical user interface (GUI) provided by the system. Alternatively, the user can enter the instruction through a command line interface. In either case, the high level design constraint can be assigned to the HLMS component enumerated in the instruction responsive to the system executing the instruction.

FIG. 2 illustrates an example of how a high level design constraint, in this case a high level TIG design constraint, can be translated into a series of low level TIG design constraints and assigned to appropriate low level circuit components. Instruction 205 can be received by the system, whether specified via a GUI or entered via a command line by the user. Instruction 205 includes a pneumonic "xlAddConstraint." The pneumonic commands the system to assign a high level design constraint to an HLMS component within the subsystem currently loaded in the design environment of the system.

In this example, the pneumonic includes two arguments. The first argument, called "lineHandle," specifies the name of the particular HLMS component, in this case a signal line, within the HLMS circuit design to which the high level design constraint is to be assigned. The second argument indicates the particular type of design constraint that is to be applied to the HLMS component enumerated by the first argument. As noted, in this example the high level design constraint is a high level TIG design constraint. Accordingly, the second argument specifies "TIG." Thus, execution of instruction 205 by the system assigns the high level TIG design constraint to the HLMS component enumerated by "lineHandle."

Consider the case in which the particular signal line referenced by "lineHandle" in instruction 205 has a type of "Fix_8_6". The data type indicates that the signal line represents an eight bit signal. Thus, when the signal line is translated into low level circuit components, eight wires are generated. When the HLMS circuit design is translated into a low level circuit design, the high level TIG design constraint is translated into a plurality of low level TIG constraints 210. One low level TIG constraint is automatically generated for each wire derived from the signal line enumerated by "lineHandle" in instruction 205.

When an HLMS component is translated into a low level circuit component, various actions can be taken that modify the HLMS component name that is used for the corresponding low level circuit component names. These actions usually result in what may be a virtually unrecognizable name for the low level circuit components. Examples of the actions taken by the system to form the name of the low level circuit component from the HLMS component name can include, but are not limited to, inserting various codes, e.g., hash codes, into the HLMS component name, pre-pending or appending different identifiers to different portions of the HLMS component name, and/or stripping identifying names and labels from the HLMS component name. These actions can occur for a variety of different reasons such as the need to flatten the hierarchical HLMS circuit design in preparation for netlisting. Thus, determining that the low level circuit components referenced by low level design constraints 210 were derived from the HLMS component specified by "lineHandle" within instruction 205 solely from a comparison of the names would be difficult if not impossible without maintaining a record of the transformation.

Thus, in one embodiment, the system can track the low level circuit components that are generated, or derived, from corresponding HLMS components. The relationship between the HLMS components and the corresponding low level circuit components can be stored in memory in the form of a table, a database, or some other suitable data structure. Thus, each record or records can indicate the low level circuit component(s) generated or derived from a selected HLMS component of the HLMS circuit design.

Referring to low level design constraints 210, each low level TIG design constraint is specified for a wire named "corresponding_low_level_hierarchy_name<n>" in reference to the particular name of the wire in the low level circuit design that is generated from the HLMS component specified by the "lineHandle" argument of instruction 205. Low level design constraints 210 can be generated using the stored records that specify the relationship between the HLMS component referenced by the "lineHandle" argument and each low level circuit component having the name "corresponding_low_level_hierarchy_name<n>," wherein "n" represents the numeric values of 0, 1, 2, 3, 4, 5, 6, and 7, corresponding to the eight bit wide signal line used as an example.

Figure 3:
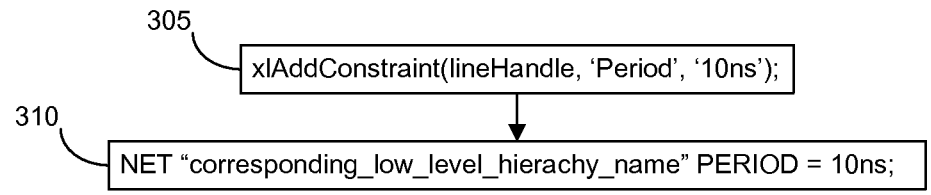
FIG. 3 is a third block diagram illustrating the translation of a high level design constraint to a low level design constraint in accordance with another embodiment of the present invention.

FIG. 3 is a third block diagram illustrating the translation of a high level design constraint to a low level design constraint in accordance with another embodiment of the present invention. More particularly, FIG. 3 illustrates the translation of a high level design constraint assigned to a signal line type of HLMS component to a corresponding low level design constraint as performed by the system illustrated with reference to FIGS. 1-2. In the example presented in FIG. 3, the high level design constraint is a "Period" type of high level design constraint.

Instruction 305, when executed by the system, assigns the high level Period design constraint to the signal line specified by the first argument of instruction 305, denoted as "lineHandle," within the HLMS circuit design. The second argument of instruction 305 specifies the actual time constraint to be applied to the period of the enumerated signal line. For purposes of illustration, the signal line within the HLMS circuit design refers to a one bit signal. Thus, the corresponding low level circuit component which is an HDL wire having the name "corresponding_low_level_hierarchy_name" in this example, is associated with low level design constraint 310. Low level design constraint 310 is generated automatically by the system when the HLMS circuit design is translated into a low level circuit design. It should be appreciated that particular values such as "10 ns" can be represented in any of a variety of different formats. For example, "10 ns" can be replaced with "10e-9" if so desired.

Figure 4:
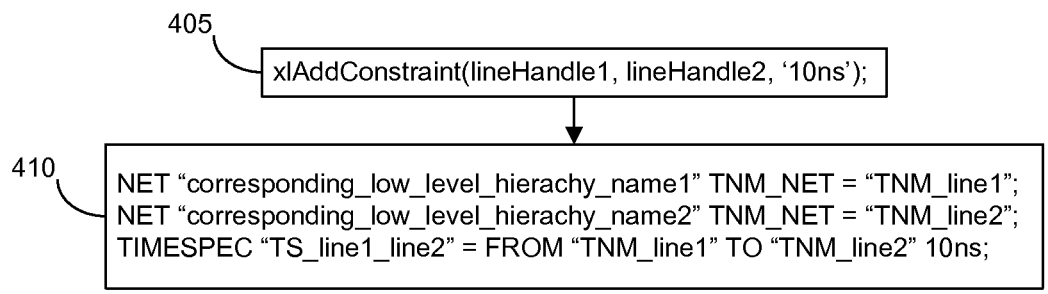
FIG. 4 is a fourth block diagram illustrating the translation of a high level design constraint to low level design constraints in accordance with another embodiment of the present invention.

FIG. 4 is a fourth block diagram illustrating the translation of a high level design constraint to low level design constraints in accordance with another embodiment of the present invention. More particularly, FIG. 4 illustrates the translation of a high level design constraint assigned to a signal line type of HLMS component to a plurality of low level design constraints as performed by the system illustrated with reference to FIGS. 1-3. In the example presented in FIG. 4, the high level design constraint is a "From/To" type of design constraint.

Instruction 405, when executed by the system, assigns a high level "From/To" type of design constraint to the signal path enumerated by each of the first two arguments, in this case "lineHandle1" and "lineHandle2". In general, the high level From/To design constraint indicates the minimum delay through the path enumerated by the two HLMS components. The third argument specifies the minimum time requirement, e.g., "10 ns" in this case, for a signal to propagate through the enumerated path.

The system generates low level design constraints 410 from the high level design constraint that is assigned to the HLMS circuit design through execution of instruction 405. Low level design constraints 410 indicate that the "corresponding_low_level_hierachy_name1," in reference to the low level component generated from "lineHandle1," and "corresponding_low_level_hierachy_name2," in reference to the low level component generated from "lineHandle2," are associated with the timing requirement "10 ns."

The formative "TNM_NET" is an attribute used to identify elements that compose a group. The group can be used within in a timing specification, e.g., to specify timing design constraints. A "Time Name," in reference to the group, can be created using elements associated by nets. In this case, two groups called "TNM_line1" and "TNM_line2" are formed corresponding to the nets specified by lineHandle1 and lineHandle2 respectively.

Figure 5:
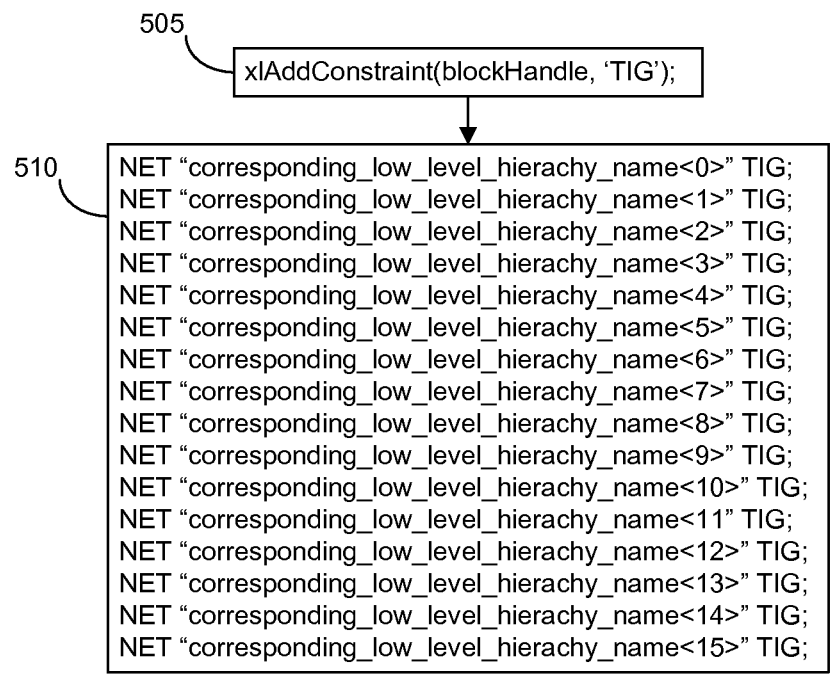
FIG. 5 is a fifth block diagram illustrating the translation of a high level design constraint to low level design constraints in accordance with another embodiment of the present invention.

FIG. 5 is a block diagram illustrating the translation of a high level design constraint to low level design constraints in accordance with another embodiment of the present invention. More particularly, FIG. 5 illustrates the translation of a high level design constraint assigned to a block type of HLMS component to a plurality of corresponding low level design constraints as performed by the system illustrated with reference to FIGS. 1-4. In the example presented in FIG. 5, the high level design constraint is a "TIG" type of constraint.

Instruction 505, when executed by the system, assigns the high level design constraint specified by the second argument, in this case a high level TIG design constraint, to the block specified by the first argument, i.e., "blockHandle." In this regard, FIG. 5 illustrates an alternative approach to assigning high level design constraints. Rather than associating the high level design constraint with a signal line with the HLMS circuit design, a high level design constraint can be assigned to a block. The result is similar in that when the HLMS circuit design is translated into a low level circuit design, the various nets, or wires, that are coupled to the low level circuit components derived from the HLMS component specified by "blockHandle" are associated with the low level TIG design constraint.

In the example of FIG. 5, the block referenced by "blockHandle" can be a "Gateway In" or a "Gateway Out" type of block having a data type of "Fix_16_24." In this example, the block either receives or outputs a 16 bit signal, depending upon whether the block is of the "in" or "out" variety. Thus, low level design constraints 510 are generated corresponding to each of wires 0-15 of the low level circuit design that couple to the low level circuit components generated from the block specified by "blockHandle" in instruction 505.

Figure 6:
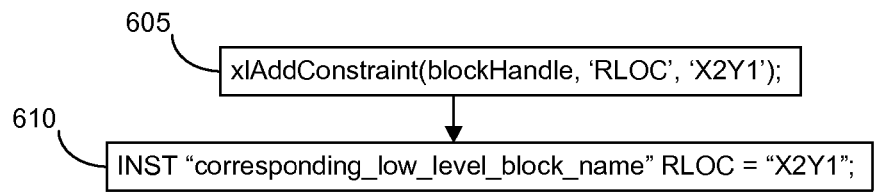
FIG. 6 is a sixth block diagram illustrating the translation of a high level design constraint to a low level design constraint in accordance with another embodiment of the present invention.

FIG. 6 is a block diagram illustrating the translation of a high level design constraint to a low level design constraint in accordance with another embodiment of the present invention. More particularly, FIG. 6 illustrates the translation of a high level design constraint assigned to a block type of HLMS component to a corresponding low level design constraint as performed by the system illustrated with reference to FIGS. 1-5. In the example presented in FIG. 6, the high level design constraint is an "RLOC" type of design constraint. The "RLOC" design constraint is a type of positioning or location design constraint for the high level component to which the high level design constraint is assigned. A high level RLOC design constraint specifies a position within the target IC within which the enumerated HLMS component is to be located.

Instruction 605 includes three arguments. The first argument "blockHandle" indicates the name of the particular block of the HLMS circuit design to which the high level design constraint is assigned. The second argument "RLOC" indicates the type of high level design constraint that will be assigned. The third argument, "X2Y1" indicates the coordinates to which the enumerated block is constrained by the high level RLOC design constraint. When instruction 605 is executed, the HLMS assigns the high level RLOC design constraint to the designated HLMS component, which is a block in this example.

When the system translates the HLMS circuit design into the low level circuit design, low level design constraint 610 is generated that assigns a low level RLOC design constraint and coordinate to the instance of the low level circuit component generated from the block specified by the "blockHandle" argument in instruction 605.

Figure 7:
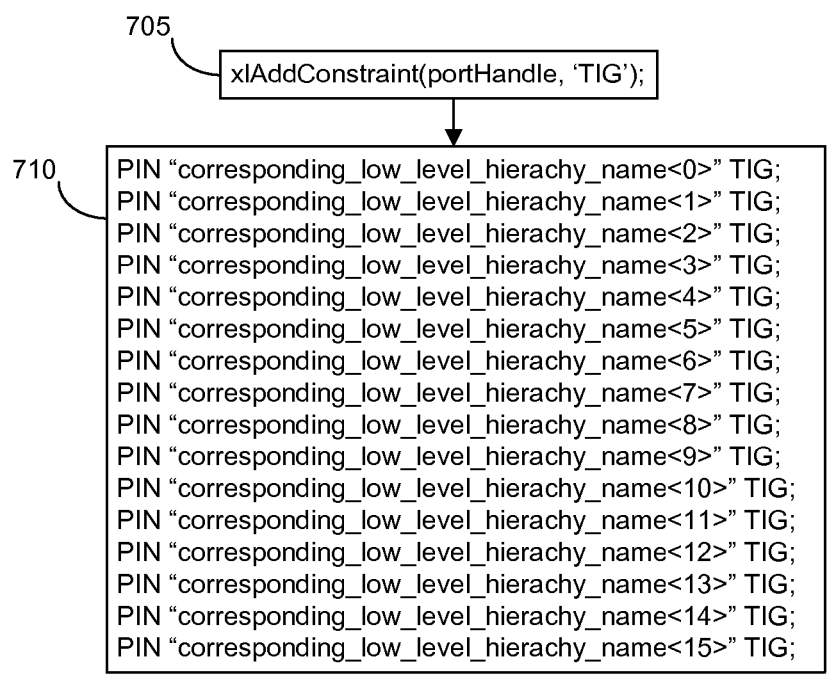
FIG. 7 is a seventh block diagram illustrating the translation of a high level design constraint to low level design constraints in accordance with another embodiment of the present invention.

FIG. 7 is a block diagram illustrating the translation of a high level design constraint to low level design constraints in accordance with another embodiment of the present invention. More particularly, FIG. 7 illustrates the translation of a high level design constraint assigned to a port type of HLMS component to a plurality of corresponding low level design constraints as performed by the system illustrated with reference to FIGS. 1-6. In the example presented in FIG. 7, the high level design constraint is a "TIG" type of design constraint.

Instruction 705, when executed by the system, assigns the high level design constraint specified by the second argument, in this case a high level TIG design constraint, to the port of the HLMS circuit design specified by the first argument, i.e., "portHandle." In this regard, FIG. 7 illustrates an alternative approach to assigning high level design constraints to a signal line. When the HLMS circuit design is translated into the low level circuit design, the port specified by the argument "portHandle" in instruction 705 represents a 16 pin interface. Accordingly, the system generates low level design constraints 710. More particularly, the system generates one low level TIG design constraint for each of the 16 pins of the low level circuit design corresponding to the port specified by the argument "portHandle" in instruction 705.

Figure 8:
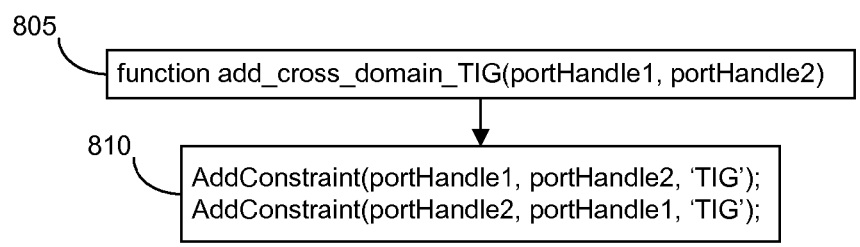
FIG. 8 is an eighth block diagram illustrating programmability of high level design constraints in accordance with another embodiment of the present invention.

FIG. 8 is a block diagram illustrating programmability of high level design constraints in accordance with another embodiment of the present invention. Within the HLMS environment, the circuit designer also can specify a function that can selectively assign one or more high level design constraints to the HLMS circuit design. The function can be created and executed using the system described with reference to FIGS. 1-7, whether through a GUI or via a command line. Instruction 805, when executed by the system, causes the system to invoke a function called "add_cross_domain_TIG." The function is comprised of instructions 810.

Thus, when instruction 805 is executed and the "add_cross_domain_TIG" function is invoked, the system executes instructions 810. Instructions 810 add the high level TIG design constraint to each of the ports specified by the arguments "portHandle1" and "portHandle2" respectively in a bi-directional manner. Conversion of the high level TIG design constraints to low level TIG design constraints when conversion of the HLMS circuit design to a low level circuit design occurs can be performed in the manner described with reference to the prior figures.

FIG. 9 is a block diagram illustrating programmability of high level design constraints in accordance with another embodiment of the present invention. FIG. 9 illustrates an example of dynamic programmability of HLMS components that can be performed by the system described with reference to FIGS. 1-8. More particularly, program code, referred to as design constraint program code, can be associated with, or stored as part of, HLMS components and executed. The design constraint program code, when executed, can first perform analysis upon the HLMS circuit design, e.g., query HLMS components, to locate particular HLMS components of interest or that meet specified criteria. The located HLMS components, e.g., the results of the query, then can be used within instructions to generate high level design constraints. Instruction 905 assigns the function "find_system," which is available within the system, to the variable "mix_stuffs." The result of the "find_system" function, when executed, is stored within "mix_stuffs," which can be used as an argument to specify a particular HLMS component to which a high level design constraint such as "MAXDELAY" is to be assigned through instruction 910.

FIG. 10 is a block diagram illustrating programmability of high level design constraints in accordance with another embodiment of the present invention. FIG. 10 illustrates another example where the design constraint program code can be associated with, or stored within, HLMS components and executed by the system described with reference to FIGS. 1-9. Design constraint program code 1005 can dynamically analyze, e.g., query, the HLMS circuit design to locate particular HLMS components of interest. The result of that query can be incorporated into further functions within design constraint program code 1005 that allow high level design constraints to be dynamically, and selectively, applied to HLMS components.

The example illustrated in FIG. 10 is design constraint program code that adds intelligence to a register type of block. Design constraint program code 1005 effectively transforms a conventional register type of block within the HLMS circuit design into one that intelligently, and dynamically, determines whether the register is located across, or coupled between, two different clock domains within the HLMS circuit design. Based upon that intelligent and dynamic determination, when executed, design constraint program code 1005 generates the proper high level, cross clock domain design constraints.

In one embodiment, the program code examples illustrated within this specification can be incorporated into HLMS components, whether blocks, ports, signal lines, or the like. Thus, when the HLMS component is moved or re-used within the HLMS circuit design, the program code, e.g., design constraint program code 1005, is moved with the HLMS component. Using the dynamic techniques described, the program code can execute responsive to an enumerated execution condition.

One or more conditions can be associated with each HLMS component that, when met, cause the system to execute any design constraint program code, e.g., design constraint program code 1005, embedded or associated with the HLMS component. Such a condition can be referred to herein as an "execution condition." Examples of execution conditions that can be defined and associated with design constraint program code can include, but are not limited to, inserting an HLMS component into the HLMS circuit design, moving an HLMS component already placed within the HLMS circuit design to another location within the HLMS circuit design on screen, establishing a coupling between the HLMS component comprising embedded design constraint program code with at least one other, or each other, HLMS component, changing a coupling between an HLMS component comprising embedded design constraint program code and any other HLMS component of the HLMS circuit design, executing a simulation of the HLMS circuit design, or the like. The aforementioned examples relate to events pertaining directly to the HLMS component comprising the embedded design constraint program code. Other examples that are broader in nature, e.g., are global with respect to the HLMS circuit design, can include detecting a request for conversion or translation of the HLMS circuit design to a low level circuit design, receiving a request to execute design constraint program code of one or more or each HLMS component in the HLMS circuit design, or the like. Thus, the system can monitor for the occurrence of execution conditions and, when one is detected, execute any design constraint program code of HLMS components in the HLMS circuit design associated with the detected execution condition(s).

For purposes of illustration, consider the case in which a circuit designer drags a first block into an HLMS circuit design. The circuit designer need not explicitly note particular connections to the first block in order to specify a high level design constraint within the HLMS circuit design. Rather, the design constraint program code contained within the first block, e.g., design constraint program code 1005, can be executed responsive to one or more execution conditions. Responsive to detecting the occurrence of an execution condition, design constraint program code 1005 included in the first block can be executed.

HLMS components that couple to the first block can be detected through querying the HLMS circuit design by execution of the design constraint program code as described and used in the determination of whether one or more high level design constraints are to be applied to the HLMS circuit design. As noted, program code 1005 can detect and/or determine particular conditions that must be met or exist within the HLMS circuit design in order to assign the particular high level design constraints specified within program code 1005 to the relevant HLMS components. It should be appreciated that the high level design constraints to be assigned per the design constraint program code can be assigned to the particular HLMS component containing the design constraint program code or to one or more other HLMS components determined through querying of the HLMS circuit design based upon various attributes of the HLMS circuit design described within this specification.

Design constraint program code 1005 generally implements an intelligent register type of block. Design constraint program code 1005 determines a first block coupled to the register and a second block coupled to the register. When either of the first or second blocks belongs to a different clock domain than the register, a high level TIG design constraint is added to the relevant port of the register, e.g., the particular port that couples to the block belonging to a different clock domain than the register.

In one embodiment, when the HLMS operates in a Simulink environment as described, the high level design constraints can be added to the mask initialization function of the block. Within the Simulink environment, for example, the operator "gcbh" refers to the handle of the current HLMS component under processing. The operator "gcbh" can be followed by the "xlAddConstraint" function call so that the embedded instructions work relative to the block/subsystem in which the function call is embedded. Within this configuration, the high level design constraints can be embedded as MATLAB programs. Thus, as mentioned, the high level design constraints can adapt dynamically based on the settings of the subsystems, blocks, ports, and/or signal lines in which the function(s) are embedded or otherwise associated.

It should be appreciated that while MATLAB programs are used as examples, program code such as design constraint program code 1005 can be specified using any of a variety of different programming languages, whether a high level language, an interpretive programming language, or the like. Further, the functions can be specified in a compiled format, e.g., in executable form, or can be compiled or otherwise processed on the fly, e.g., at runtime of the system.

In any case, by embedding design constraint program code 1005 within HLMS components, the HLMS components can be stored within a library for reuse. Subsequently, when the HLMS component is included within an HLMS circuit design, whether the same HLMS circuit design or a different HLMS circuit design, when the execution condition for design constraint program code 1005 embedded in the HLMS component is met, design constraint program code 1005 can execute. Thus, design constraint program code 1005 can execute and determine whether the block is disposed between two different clock domains.

Figure 11:
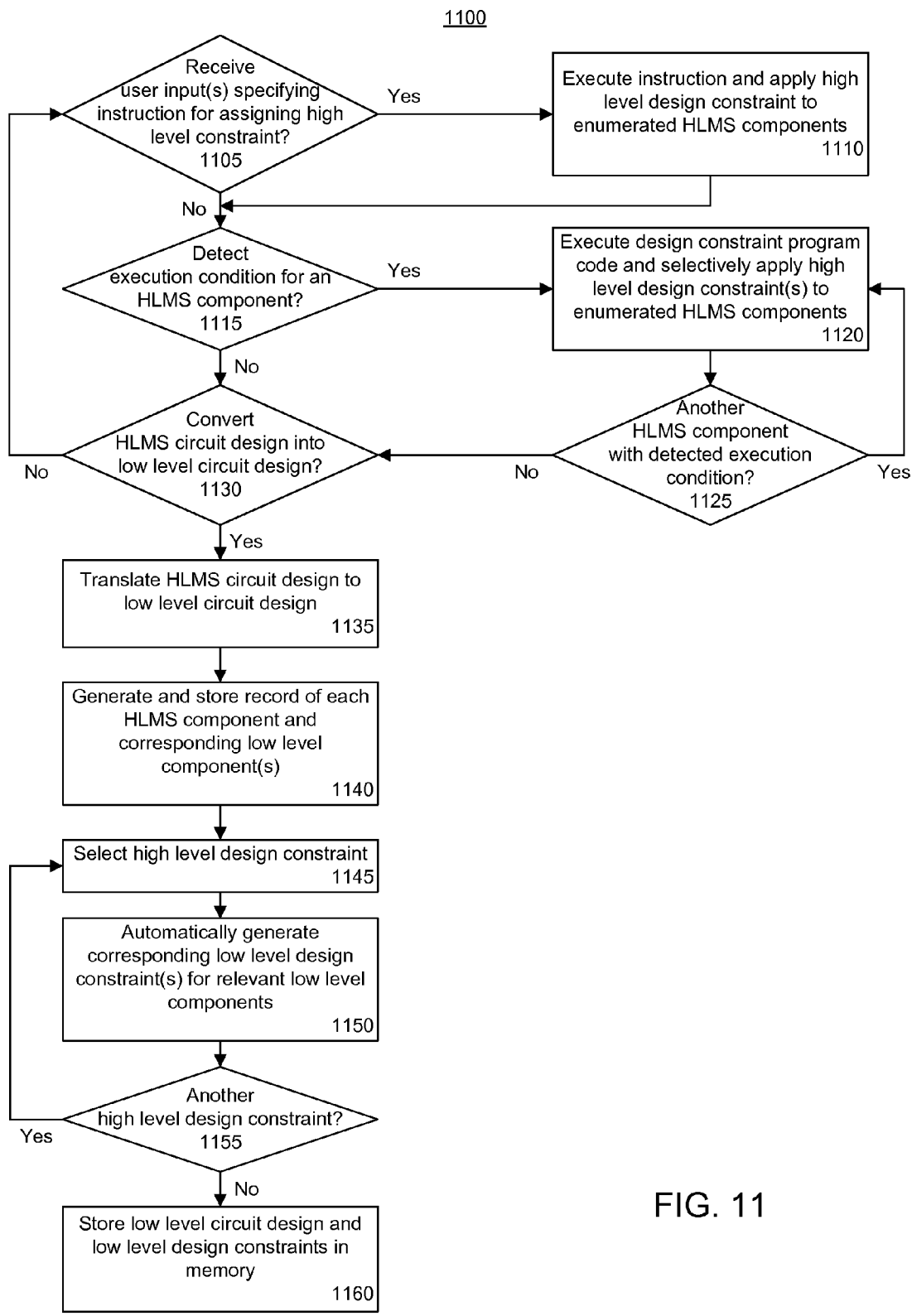
FIG. 11 is a flow chart illustrating a method of circuit design in accordance with another embodiment of the present invention.

FIG. 11 is a flow chart illustrating a method 1100 of circuit design in accordance with another embodiment of the present invention. Method 1100 can be performed by a system as described with reference to FIGS. 1-10. Accordingly, method 1100 can begin in a state where a system comprising an HLMS is executing and a circuit designer is creating a high level circuit design within the system.

Beginning in step 1105, the system can determine whether one or more user inputs specifying an instruction for assigning a high level design constraint has been received. The user inputs specifying the instruction can be received through a command line or through a GUI of the system. If an instruction has been received, method 1100 can continue to step 1110. In step 1110, the system can execute the instruction and apply the high level design constraint, or constraints as the case may be, enumerated by the instruction to the HLMS component(s) also enumerated by the instruction.

Continuing with step 1115, the system can determine whether an execution condition for an HLMS component has been detected. As noted, HLMS components can include or be associated with design constraint program code that, when executed, causes the system to dynamically, and selectively, assign high level design constraints to one or more HLMS components. The design constraint program code can be associated with one or more execution conditions that, when met, cause the system to execute the design constraint program code.

Accordingly, when the system detects an execution condition, method 1100 can proceed to step 1120. When the system does not detect an execution condition, method 1100 proceeds to step 1130. Continuing with step 1120, the design constraint program code for a selected HLMS component that is associated with the detected execution condition can be executed. As noted, the design constraint program code specifies the particular conditions that must be met in order to apply the high level design constraint(s) in the instructions to the enumerated HLMS components. The enumerated HLMS components can be specified directly as arguments within instructions within the design constraint program code or can be determined dynamically through one or more queries directed against the HLMS circuit design as described.

In step 1125, the system can determine whether there is another HLMS component associated with design constraint program code that is associated with the detected execution condition. If so, method 1100 can loop back to step 1120 to execute the design constraint program code of the HLMS component determined in step 1125. When no further HLMS components having design constraint program code associated with the detected execution condition remain, method 1100 can proceed to step 1130.

In step 1130, the system can determine whether a request to translate the HLMS circuit design into a low level circuit design has been received. If so, the method can continue to step 1135. If not, method 1100 can loop back to step 1105 to continue monitoring for received instructions, detected execution conditions, and requests to translate the HLMS circuit design into a low level circuit design.

Continuing with step 1135, the system can translate the HLMS circuit design into a low level circuit design. Each of the HLMS components can be translated into one or more corresponding low level circuit components such as HLD circuit components or elements in a netlist. It should be appreciated that since the conversion of the HLMS circuit design into a low level circuit design can be an execution condition, any design constraint program code associated with such an execution condition can be executed as described with reference to step 1120. In step 1140, the system can generate and store a record of the translation of each HLMS component to corresponding low level circuit component(s). The record(s) can indicate each HLMS component and the low level circuit component(s) derived from each respective HLMS component.

In step 1145, the system can select a high level design constraint for translation into a low level design constraint. In step 1150, the system can automatically generate one or more low level design constraints from the high level design constraint and assign the low level design constraint(s) to the relevant low level circuit components. For example, the system, using the records generated specifying HLMS components and corresponding low level circuit components, can apply the low level design constraint to the low level circuit component(s) derived from the HLMS components to which the high level design constraint is assigned.

In step 1155, the system can determine whether there is another high level design constraint that requires processing. If so, method 1100 can loop back to step 1145 to select a next high level design constraint to be translated. If not, method 1100 can continue to step 1160. In step 1160, the low level circuit design and the low level design constraints for the low level circuit design can be stored in memory of the system or otherwise output. The low level circuit design can be stored in association with the low level design constraint(s). As used herein, "outputting" and/or "output" can mean, for example, writing to a file, writing to a user display or other output device, storing in memory, sending or transmitting to another system, or the like. It should be appreciated that within this specification, when an element is determined, generated, output, or the like, in performing that step, the system can store the element within memory.

The system can further process the resulting low level circuit design for ultimate implementation within a target IC. In one embodiment, the low level circuit design can be processed and further translated into configuration data, such as a bitstream, that can be loaded into a programmable IC. In that case, upon loading the configuration data into the programmable IC, the circuit specified by the configuration data is instantiated within the programmable IC.

The flowcharts in the figures illustrate the architecture, functionality, and operation of possible implementations of systems, methods and computer program products according to various embodiments of the present invention. In this regard, each block in the flowcharts may represent a module, segment, or portion of code, which comprises one or more portions of executable program code that implements the specified logical function(s).

It should be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It also should be noted that each block of the flowchart illustrations, and combinations of blocks in the flowchart illustrations, can be implemented by special purpose hardware-based systems that perform the specified functions or acts, or combinations of special purpose hardware and executable instructions.

One or more embodiments of the present invention can be realized in hardware or a combination of hardware and software. One or more embodiments can be realized in a centralized fashion in one system or in a distributed fashion where different elements are spread across several interconnected systems. Any kind of data processing system or other apparatus adapted for carrying out the methods described herein is suited.

One or more embodiments of the present invention further can be embedded in a device such as a computer program product, which comprises all the features enabling the implementation of the methods described herein. The device can include a data storage medium, e.g., a computer-usable or computer-readable storage medium, storing program code that, when loaded and executed in a system comprising a memory and a processor, causes the system to perform the functions described herein. Examples of data storage media can include, but are not limited to, optical media, magnetic media, magneto-optical media, computer memory such as random access memory or hard disk(s), or the like.

The terms "computer program," "software," "application," "computer-usable program code," "program code," "executable code," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, program code can include, but is not limited to, a subroutine, a function, a procedure, an object method, an object implementation, an executable application, an applet, a servlet, a source code, an object code, a shared library/dynamic load library and/or other sequence of instructions designed for execution on a computer system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising, i.e., open language. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system.

One or more embodiments disclosed herein can be embodied in other forms without departing from the spirit or essential attributes thereof. Accordingly, reference should be made to the following claims, rather than to the foregoing specification, as indicating the scope of the embodiments of the present invention.

What is claimed is:

1. A method for designing a circuit comprising:
   embedding design constraint program code within a first high level circuit component of a high level circuit design within a high level modeling system, wherein the design constraint program code is specific to the first high level circuit component and specifies a high level design constraint and a criterion for applying the high level design constraint;
   responsive to detecting an execution condition occurring within the high level circuit design, executing the design constraint program code within the high level modeling system;
   wherein the execution condition comprises detecting a user specified change to the first high level circuit component; and
   responsive to executing the design constraint program code, determining whether the criterion for applying the high level design constraint is met and, responsive to determining that the criterion is met, applying the high level design constraint to at least one selected high level circuit component of the high level circuit design;
   translating the high level circuit design into a low level circuit design comprising a low level circuit component derived from the first high level circuit component;
   automatically generating, using a processor, a low level design constraint from the high level design constraint for the low level circuit component; and
   storing the low level design constraint in association with the low level circuit design.

2. The method of claim 1, further comprising selecting the high level circuit component to be a high level circuit component that represents an internal node of the high level circuit design;
   wherein an internal node of the high level circuit design is a connection that is not a top level port used to access the high level circuit design from another subsystem.

3. The method of claim 1, wherein the at least one selected high level circuit component is different from the first high level circuit component.

4. The method of claim 1, wherein:
   the design constraint program code further comprises a query that, when executed, determines the least one selected high level circuit component to which the high level design constraint is applied; and
   the query is executed as part of the design constraint program code responsive to the execution condition.

5. The method of claim 1, wherein the selected high level circuit component is the first high level circuit component.

6. The method of claim 1, wherein the query further determines a second high level circuit component to which the high level design constraint is also applied.

7. The method of claim 1, wherein the user specified change to the first high level circuit component is a user input moving or re-using a circuit block upon a display screen that represents the first high level circuit component within the high level circuit design.

8. A method for designing a circuit comprising:
   embedding design constraint program code within a first high level circuit component of a high level circuit design within a high level modeling system, wherein the design constraint program code is specific to the first high level circuit component and specifies at least one high level design constraint and at least one criterion for applying the high level design constraint;
   responsive to detecting an execution condition within the high level circuit design, executing the design constraint program code within the high level modeling system;
   wherein the execution condition comprises a user specified change to the first high level circuit component within the high level circuit design;
   responsive to executing the design constraint program code, determining, using a processor, whether the at least one criterion is met and, responsive to determining that the at least one criterion is met, applying the high level design constraint to at least one selected high level circuit component of the high level circuit design; and
   storing the high level circuit design comprising the high level design constraint in a memory.

9. The method of claim 8, wherein the execution condition is a user input moving or re-using a circuit block upon a display screen that represents the first high level circuit component within the high level circuit design.

10. The method of claim 8, wherein determining whether the at least one criterion is met comprises:
    determining an attribute of the high level circuit design;
    wherein the high level design constraint is applied to the at least one selected high level circuit component according to the attribute.

11. The method of claim 8, wherein the at least one selected high level circuit component is the first high level circuit component.

12. The method of claim 8, wherein:
    the design constraint program code further comprises a query that, when executed, determines the least one selected high level circuit component to which the high level design constraint is to be applied; and the query is executed as part of the design constraint program code responsive to the execution condition.

13. The method of claim 8, wherein the at least one selected high level circuit component is different from the first high level circuit component.

14. A device comprising:

a non-transitory data storage medium usable by a processor, wherein the data storage medium stores program code that, when executed by the processor, causes the processor to perform operations comprising:

embedding design constraint program code within a first high level circuit component of a high level circuit design within a high level modeling system, wherein the design constraint program code is specific to the first high level circuit component and specifies a high level design constraint and a criterion for applying the high level design constraint;

responsive to detecting an execution condition occurring within the high level circuit design, executing the design constraint program code within the high level modeling system;

wherein the execution condition comprises detecting a user specified change to the first high level circuit component; and responsive to executing the design constraint program code, determining whether the criterion for applying the high level design constraint is met and, responsive to determining that the criterion is met, applying the high level design constraint to at least one selected high level circuit component of the high level circuit design;

translating the high level circuit design into a low level circuit design comprising a low level circuit component derived from the first high level circuit component;

automatically generating a low level design constraint from the high level design constraint for the low level circuit component; and storing the low level design constraint in association with the low level circuit design.

15. The device of claim 14, wherein the data storage medium further causes the processor to execute an operation comprising selecting the high level circuit component to be a high level circuit component that represents an internal node of the high level circuit design;

wherein an internal node of the high level circuit design is a connection that is not a top level port used to access the high level circuit design from another subsystem.

16. The device of claim 14, wherein the at least one selected high level circuit component is different from the first high level circuit component.

17. The device of claim 14, wherein:

the design constraint program code further comprises a query that, when executed, determines the least one selected high level circuit component to which the high level design constraint is applied; and the query is executed as part of the design constraint program code responsive to the execution condition.

18. The device of claim 14, wherein the selected high level circuit component is the first high level circuit component.

\* \* \* \* \*